(12) United States Patent
Sommer et al.

(10) Patent No.: US 12,231,753 B1
(45) Date of Patent: Feb. 18, 2025

(54) FLEXURE ARM SEPARATOR FOR FLEXURE MODULE OF CAMERA WITH MOVEABLE IMAGE SENSOR

(71) Applicant: Apple Inc., Cupertino, CA (US)

(72) Inventors: Phillip R Sommer, Newark, CA (US); Seyed Mohammad Javid Mahmoudzadeh, San Jose, CA (US)

(73) Assignee: Apple Inc., Cupertino, CA (US)

( * ) Notice: Subject to any disclaimer, the term of this patent is extended or adjusted under 35 U.S.C. 154(b) by 141 days.

(21) Appl. No.: 17/930,383

(22) Filed: Sep. 7, 2022

(51) Int. Cl.
    *H04N 23/54* (2023.01)
    *H04N 23/50* (2023.01)
    *H04N 23/55* (2023.01)
    *H04N 23/67* (2023.01)
    *H04N 23/68* (2023.01)

(52) U.S. Cl.
    CPC ............. *H04N 23/54* (2023.01); *H04N 23/50* (2023.01); *H04N 23/55* (2023.01); *H04N 23/67* (2023.01); *H04N 23/687* (2023.01)

(58) Field of Classification Search
    CPC ........ H04N 23/55; H04N 23/54; H04N 23/50; H04N 23/67; H04N 23/687; G03B 2205/0053–0084; G03B 7/10; G03B 2205/0061; G02B 7/04–105
    See application file for complete search history.

(56) References Cited

U.S. PATENT DOCUMENTS

| | | | |
|---|---|---|---|
| 7,679,647 B2 | 3/2010 | Stavely et al. | |
| 8,937,665 B2 * | 1/2015 | Kim | G02B 27/646 359/554 |
| 9,366,879 B1 | 6/2016 | Miller | |
| 10,259,702 B2 * | 4/2019 | Liu | B81B 3/0051 |
| 11,057,564 B2 | 7/2021 | Johnson et al. | |
| 11,622,064 B2 * | 4/2023 | Park | H04N 23/687 348/208.7 |
| 2003/0227700 A1 * | 12/2003 | Mizuno | B81C 1/00182 310/309 |
| 2007/0002159 A1 * | 1/2007 | Olsen | H01L 27/14625 348/335 |
| 2007/0241076 A1 * | 10/2007 | Moffat | B81C 1/00174 216/2 |
| 2008/0017942 A1 * | 1/2008 | Kosaka | H04N 23/6812 257/E31.127 |
| 2008/0198249 A1 * | 8/2008 | Tanimura | H04N 23/68 348/294 |

(Continued)

FOREIGN PATENT DOCUMENTS

WO  2021111131  6/2021

*Primary Examiner* — Abdelaaziz Tissire
(74) *Attorney, Agent, or Firm* — Robert C. Kowert; Kowert, Hood, Munyon, Rankin & Goetzel, P.C.

(57) ABSTRACT

A camera includes a lens group, an image sensor, an actuator to move the image sensor relative to the lens group, and a flexure that suspends the image sensor from a stationary structure of the camera and that allows motion of the image sensor enabled by the actuator. The flexure includes a dynamic platform to which the image sensor is connected such that the image sensor moves with the dynamic platform, a static platform connected to a static portion of the camera, a plurality of flexure arms that mechanically connect the dynamic platform to the static platform, and one or more elastic spacers positioned between at least two flexure arms of the plurality of flexure arms.

20 Claims, 15 Drawing Sheets

(56) References Cited

U.S. PATENT DOCUMENTS

| | | | |
|---|---|---|---|
| 2009/0213236 A1* | 8/2009 | Chiou | H04N 23/58 |
| | | | 348/208.11 |
| 2011/0136283 A1* | 6/2011 | Gritters | B81C 1/00182 |
| | | | 257/E21.002 |
| 2011/0303638 A1* | 12/2011 | Zhang | B29D 11/00596 |
| | | | 216/24 |
| 2014/0313355 A1* | 10/2014 | Park | H02N 1/002 |
| | | | 348/208.7 |
| 2015/0341534 A1* | 11/2015 | Ng | H04N 23/00 |
| | | | 348/208.7 |
| 2018/0210165 A1* | 7/2018 | Yasumura | B81C 1/00817 |
| 2020/0196447 A1* | 6/2020 | Mak | H05K 1/118 |
| 2020/0314338 A1* | 10/2020 | Johnson | H04N 23/55 |
| 2021/0144316 A1* | 5/2021 | Hsu | H04N 25/79 |
| 2021/0278624 A1 | 9/2021 | Wang et al. | |
| 2022/0232165 A1* | 7/2022 | Huang | H04N 23/687 |
| 2022/0247931 A1* | 8/2022 | Mahmoudzadeh | G03B 5/00 |
| 2023/0156911 A1* | 5/2023 | Tanaka | H02N 1/006 |
| | | | 348/208.11 |
| 2024/0201469 A1* | 6/2024 | Liu | G02B 27/64 |

\* cited by examiner

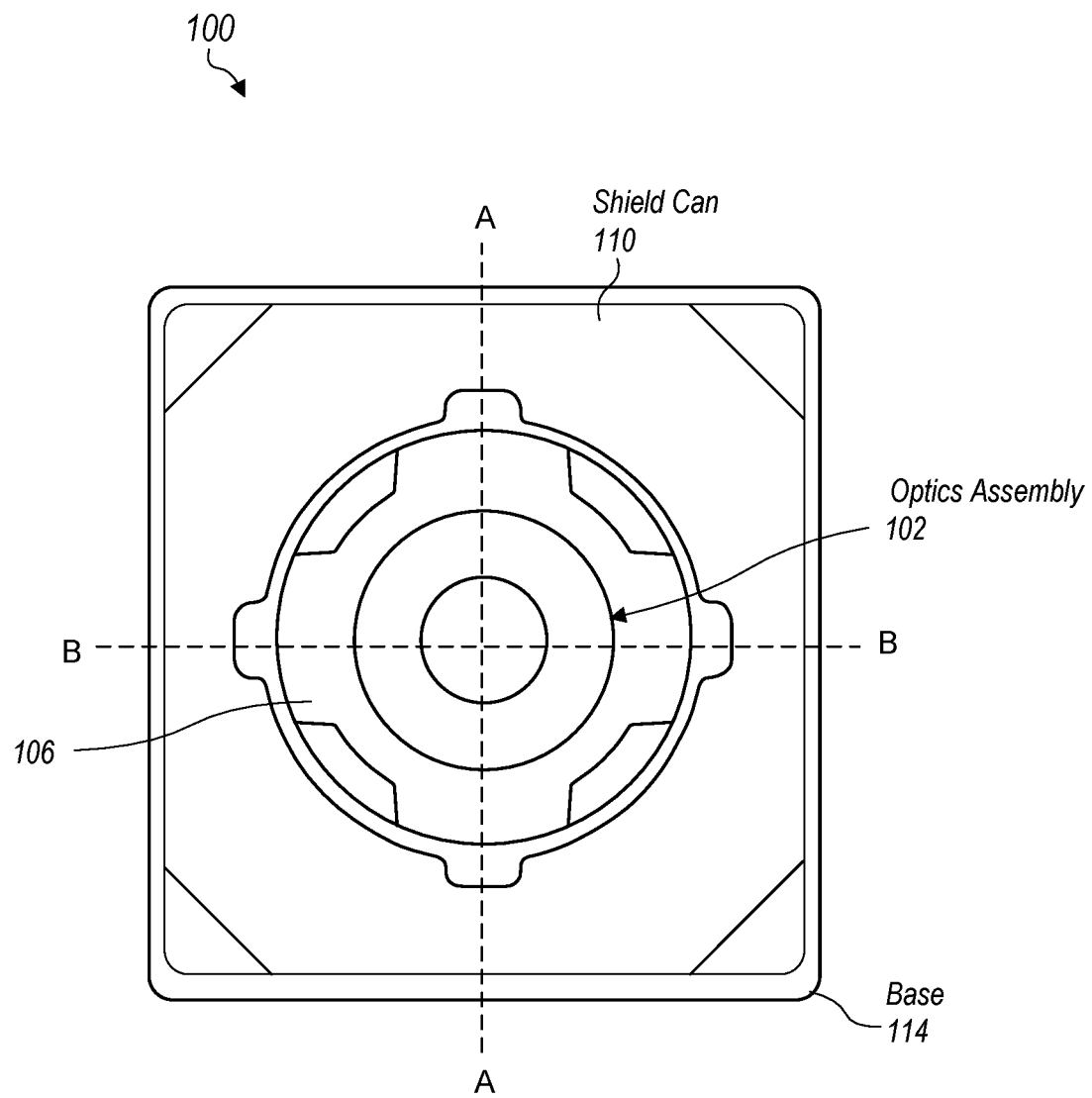
*FIG. 1*
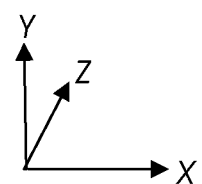

FLEXURE ARM SEPARATOR FOR FLEXURE MODULE OF CAMERA WITH MOVEABLE IMAGE SENSOR

BACKGROUND

Technical Field

This disclosure relates generally to flexure arm separators for flexure modules of a camera with a moveable image sensor.

Description of the Related Art

The advent of small, mobile multipurpose devices such as smartphones and tablet or pad devices has resulted in a need for high-resolution, small form factor cameras for integration in the devices. Some cameras may incorporate optical image stabilization (OIS) mechanisms that may sense and react to external excitation/disturbance by adjusting location of the optical lens on the X and/or Y axis in an attempt to compensate for unwanted motion of the lens. Furthermore, some cameras may incorporate an autofocus (AF) mechanism whereby the object focal distance can be adjusted to focus an object plane in front of the camera at an image plane to be captured by the image sensor. In some such AF mechanisms, the optical lens is moved as a single rigid body along the optical axis of the camera to refocus the camera.

BRIEF DESCRIPTION OF THE DRAWINGS

FIGS. 1, 2A, and 2B illustrate components of an example camera having an actuator module or assembly that may, for example, be used to provide autofocus through optics assembly movement and/or optical image stabilization through image sensor movement in small form factor cameras, according to at least some embodiments. FIG. 1 shows an overhead view of the exterior of the camera. FIG. 2A shows a cross-sectional view of the camera across the A-A plane. FIG. 2B shows a cross-sectional view of the camera across the B-B plane.

Figure 2A:
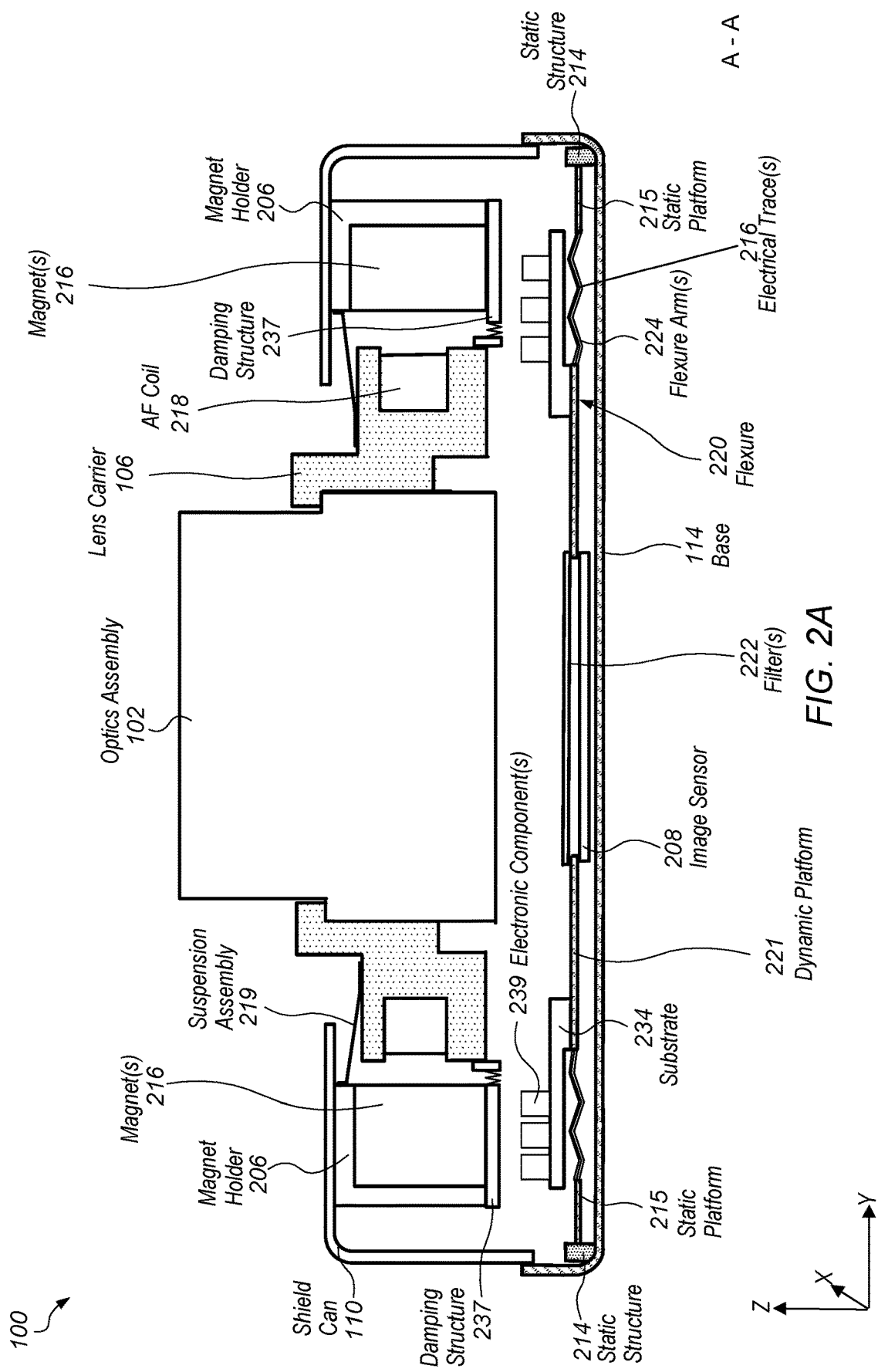

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors.

Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

Various embodiments described herein relate to a flexure module that may be used in a camera with a moveable image sensor. In some examples, the camera may include camera equipment outfitted with controls, magnets, and voice coil motors to improve the effectiveness of a miniature actuation mechanism for a compact camera module. More specifically, in some embodiments, compact camera modules include actuators to deliver functions such as autofocus (AF) and optical image stabilization (OIS). One approach to delivering a very compact actuator for OIS is to use a Voice Coil Motor (VCM) arrangement.

In some embodiments, sensor shift designs using a flexure based component may use space between flexure arms as a buffer to reduce and/or prevent the flexure arms from contacting each other during a drop or shock event. For some flexures having a relatively larger pitch between flexure arms (e.g., about a 200 μm pitch), the flexure arms may not contact each other during a drop event. However, for other flexures having a relatively smaller pitch between flexure arms (e.g., about a 100 μm pitch), the flexure arms may contact each other during a drop event. In some aspects, a tether (e.g., a stiff tether) may be used to connect adjacent flexure arms for reducing and/or preventing the flexure arms from contacting each other during a drop event. While the tether may reduce and/or prevent the flexure arms from contacting each other during a drop event, the tether may also increase the stiffness of the flexure arms in the x-direction and in the y-direction beyond an threshold stiffness limit. As described herein, as an alternative to forming a tether between flexure arms with either a base material or with a polyimide dielectric, spacers (e.g., a gel, an elastomer, a silicon-plastic material or gel) may be selectively positioned between flexure arms for permitting some relative displacement (e.g., while limiting and/or preventing an abnormal amount of displacement) as flexure arms deflect while also separating the flexure arms to prevent and/or reduce contact (e.g., touching, impact force) between the flexure arms during a drop event.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

Figure 2B:
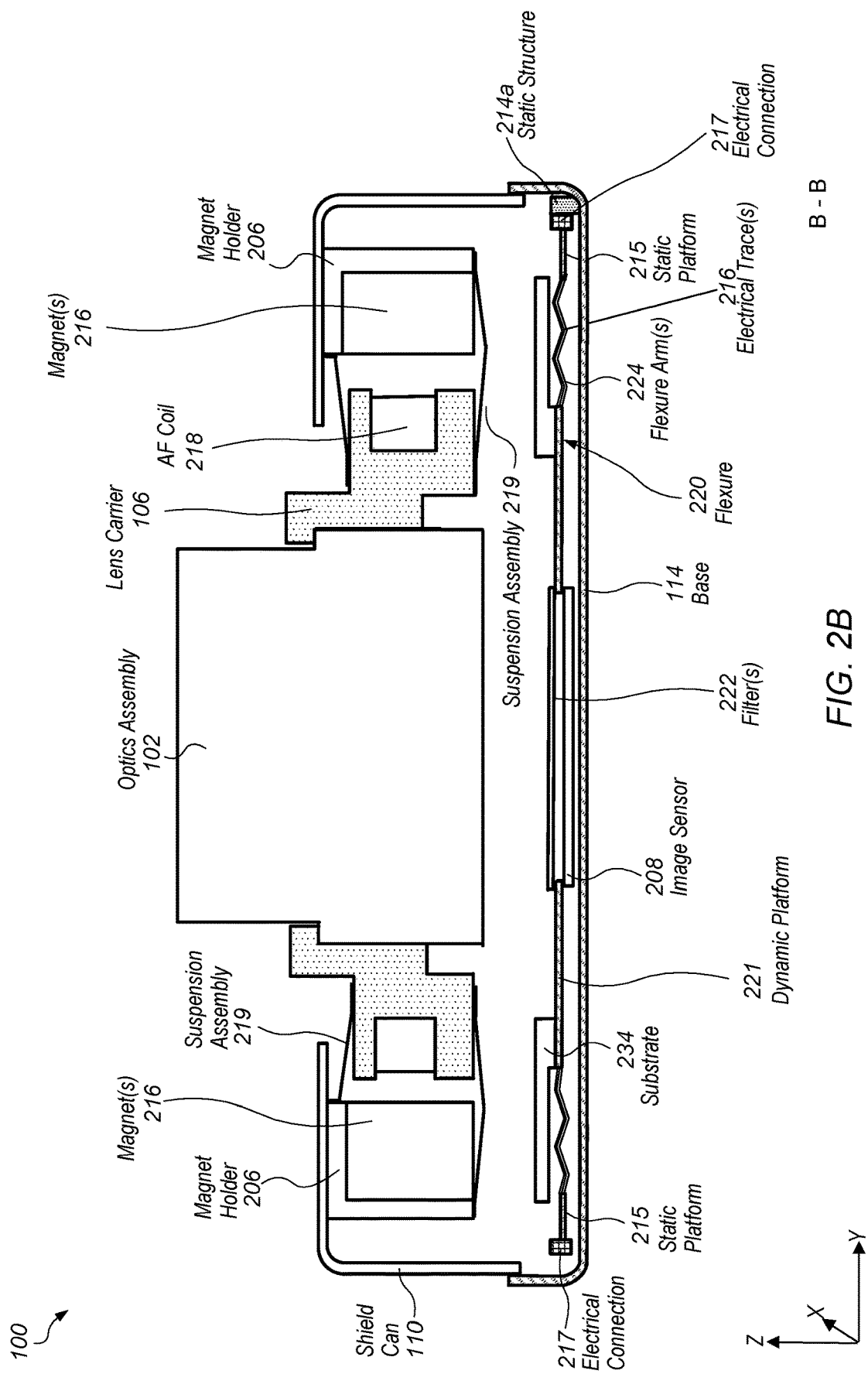

FIGS. 1, 2A, and 2B illustrate components of an example camera 100 having an actuator module or assembly that may, for example, be used to provide autofocus through optics assembly movement and/or optical image stabilization through image sensor movement in small form factor cameras, according to at least some embodiments. FIG. 1 shows an overhead view of the exterior of the camera 100. FIG. 2A shows a cross-sectional view of the camera 100 across the A-A plane. FIG. 2B shows a cross-sectional view of the camera 100 across the B-B plane. The camera module 100 may include one or more same or similar features as the features described with respect to or illustrated in FIGS. 3, 4, 5, 6, 7, 8, 9, 10, 11, 12, 13, 14, 15A, 15B, 16, and 17. The example X-Y-Z coordinate system shown in FIGS. 1, 2A, and 2B is used to discuss aspects of components and/or systems, and may apply to embodiments described throughout this disclosure.

In various embodiments, the camera 100 may include an optics assembly 102 having one or more lenses, a shield can 110, a magnet holder 206, magnet(s) 216, a lens carrier 106, an AF coil 218, a base 114, one or more OIS coils (e.g., OIS coils 622 illustrated in FIG. 6), a substrate 234 (e.g., an OIS FPC, printed circuit board, or the like), an image sensor 208, and an OIS frame or flexure 220. In some embodiments, the OIS frame or flexure 220 may be connected to a bottom surface of the base 114. In some examples, the base 114 may define one or more recesses and/or openings having multiple different cross-sections. For instance, a lower portion of the base 114 and/or an upper portion of the base 114 may define a recess and/or an opening with a cross-section sized to receive the OIS frame or flexure 220.

The shield can 110 may be mechanically attached to the base 114. The camera 100 may include an axial motion (AF) voice coil motor (VCM) (e.g., axial motion VCM) and/or a transverse motion (OIS) VCM. In some cases, the axial motion VCM may include the optics assembly 102, the magnet holder 206, the magnet 216, the lens carrier 106, and/or the AF coil 218. Furthermore, the transverse motion VCM may include the OIS coils (e.g., OIS coils 622 illustrated in FIG. 6), the substrate 234, the image sensor 208, the OIS frame or flexure 220 including the dynamic platform 221, the static platform 215, and the plurality of flexure arms 224 described herein. In some examples, the axial motion VCM (or a portion thereof) may be connected to the shield can 110, while the transverse motion VCM (or a portion thereof) may be connected to the base 114.

The flexure 220 may include a dynamic platform 221, a static platform 215, and a plurality of flexure arms 224. The plurality of flexure arms 224 may provide a flexible mechanical coupling between the static platform 215 and the dynamic platform 221 and allowing the dynamic platform 221 to move (e.g., using an OIS VCM) (e.g., in the x-y directions) relative to the static platform 215 (e.g., a remainder of the camera 100). In some aspects, the flexure arms 224 may include electrical traces for communicating electrical power and electrical signals between the dynamic platform 221 (e.g., one or more electronic components (e.g., electronic components 239) mounted on the substrate 234, the image sensor 208 mounted on the substrate 234, one or more electronic components mounted to the dynamic platform 221, or the like) and the static platform 215. The electronic components may be for actuation of the dynamic platform 221 of the flexure relative to the static platform 215 of the flexure 220. As shown in FIG. 2A, the static platform 215 may be attached to the static structure 214 which is stationary with the camera 100. As shown in FIG. 2B, the static platform 215 may include electrical connections 217 for facilitating electrical communication between flexure platform 220 and one or more other electrical components of the camera 100 for performing one or more camera operations. In some aspects, the static platform 215 may be in electrical communication with one or more other components of the camera 110, via the electrical connection 217 and the static structure 214a have one or more electrical pathways between the electrical connection 217 and one or more other components of the camera 100, for performing one or more camera operations.

In some non-limiting examples, the image sensor 208 may be attached to or otherwise integrated into the substrate 234, such that the image sensor 208 is connected to the OIS frame or flexure 220 via the substrate 234. For example, the dynamic platform 221 may retain the substrate 234 for mounting one or more electronic components 239 and/or the image sensor 208. The substrate 234 may include an opening with a cross-section sized to permit light to pass therethrough while also receiving or retaining the filter(s) 222 and the image sensor 208. An upper surface of a top layer of the substrate 234 may retain the filter(s) 222 around a perimeter of the opening and a lower surface of a lower layer of the substrate 234 may retain the image sensor 208 around the perimeter of the opening. In some aspects, a ceramic layer beneath the lower layer of the substrate 234 may couple the image sensor 208 to the substrate 234. In some aspects, the lower layer of the substrate 234 may include a ceramic material that may couple the image sensor 208 to the substrate 234. With the lower surface of the lower layer of the substrate 234 retaining the image sensor 208 around the perimeter of the opening, the image sensor 208 may be connected (e.g., mechanically and/or electrically) to the flexure 220 via the substrate 234. This configuration may allow the substrate 234 to retain the image sensor 208 (and the filter(s) 222) while also allowing light to pass from the lens(es) of the optics assembly 102, through the filter(s) 222, and be received by the image sensor 208 for image capturing. In other embodiments, the substrate 234 and the image sensor 208 may be separately attached to the OIS frame or flexure 220. For instance, a first set of one or more electrical traces may be routed between the substrate 234 and the OIS frame or flexure 220. A second, different set of one or more electrical traces may be routed between the image sensor 208 and the OIS frame or flexure 220. In some aspects, an AF coil may be integrated or embedded within the substrate 234.

In addition, the camera 100 may also include an AF damping structure 237 (e.g., attached to the AF coil carrier, inner surface of the shield can 101), a suspension assembly 219, and one or more electronic components 239. The AF damping structure 237 may providing damping of movement of the optics assembly 102 in the z-direction. The suspension assembly 219 may retain the optics assembly 102 within a z-range of motion relative to the shield can 110. The electronic components 239 may be positioned on the substrate 234 and may include low voltage drop-outs (LDOs), voltage regulators (e.g., capacitors), positions sensors, drivers, and/or the like. In some aspects, the electronic components 239 (e.g., voltage regulators) may provide a power supply for the image sensor 208 and other drivers (e.g., driver circuits).

Figure 3:
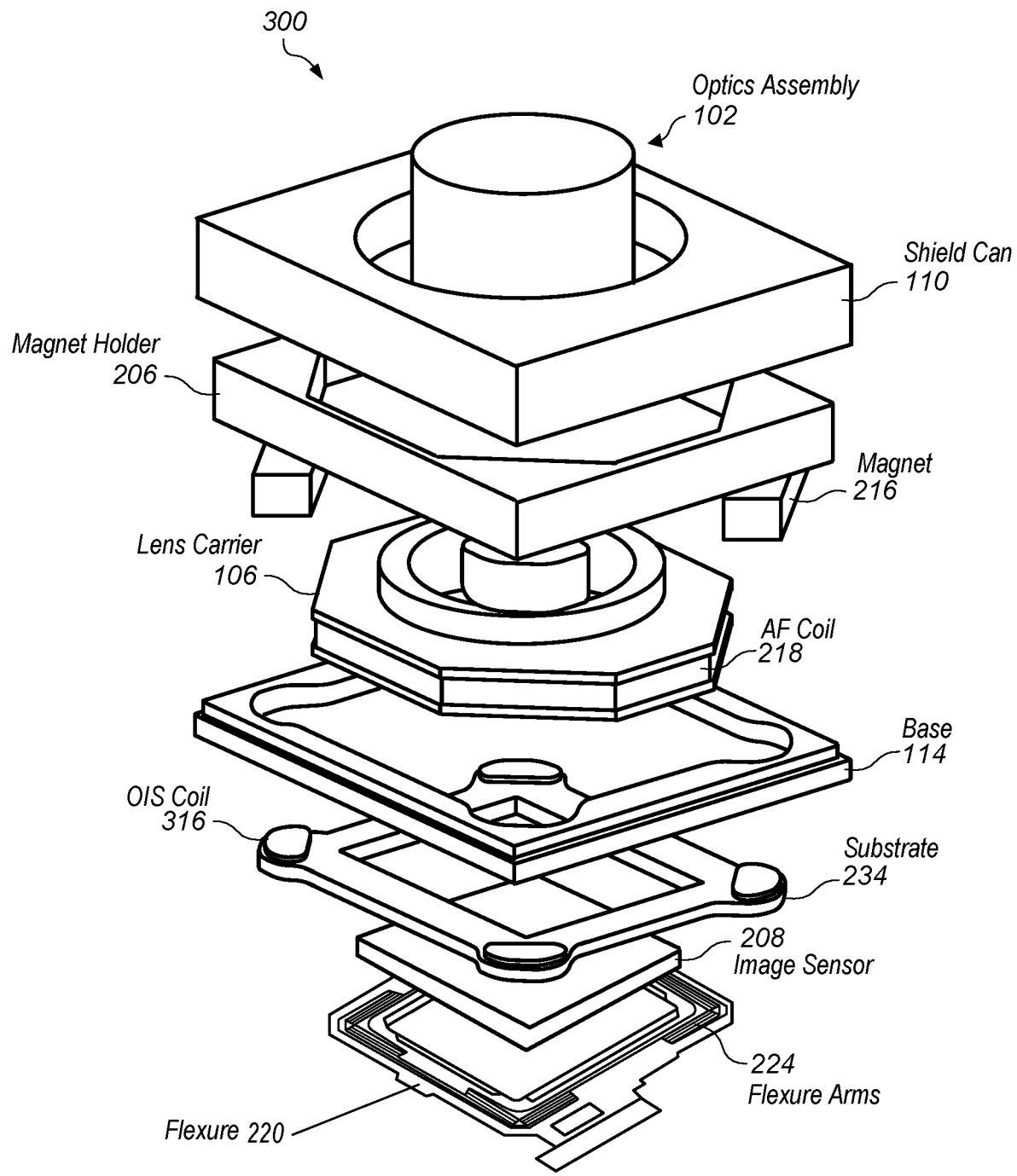
FIG. 3 shows an exploded view of an example camera having an actuator module or assembly that may, for example, be used to provide autofocus through optics assembly movement and/or optical image stabilization through image sensor movement in small form factor cameras, according to at least some embodiments.

FIG. 3 shows an exploded view of an example camera 300 having an actuator module or assembly that may, for example, be used to provide autofocus through optics assembly movement and/or optical image stabilization through image sensor movement in small form factor cameras, according to at least some embodiments. The camera 300 may include one or more same or similar features as the features described with respect to or illustrated in FIGS. 1, 2A, 2B, 4, 5, 6, 7, 8, 9, 10, 11, 12, 13, 14, 15A, 15B, 16, and 17. In various embodiments, the camera 300 may include one or more same or similar features as the camera 100 illustrated in FIGS. 1, 2A, and 2B. As shown in FIG. 3, the camera 300 may include the optics assembly 102, the shield can 110, the magnet holder 206, the magnet 216, the lens carrier 106, the AF coil 218, the base 114, an OIS coil 316, the substrate 234, the image sensor 208, the flexure 220 (e.g., in accordance with one or more embodiments of the flexure modules described herein with reference to FIGS. 5-15), and/or the flexure arms 224.

In various examples, the shield can 110 may be mechanically attached to the base 114. The camera 300 may include an axial motion (AF) voice coil motor (VCM) and/or a transverse motion (OIS) VCM. In some cases, the axial motion VCM may include the optics assembly 102, the magnet holder 206, the magnet 216, the lens carrier 106, and/or the AF coil 218. Furthermore, the transverse motion VCM may include the OIS coil 316, the substrate 234, the image sensor 208, the flexure 220, and/or the flexure arms 224. In some examples, the axial motion VCM (or a portion thereof) may be connected to the shield can 110, while the transverse motion VCM (or a portion thereof) may be connected to the base 114.

In some embodiments, the substrate 234 and/or the flexure 220 may be connected to a bottom surface of the base 114. In some examples, the base 114 may define one or more recesses and/or openings having multiple different cross-sections. For instance, a lower portion of the base 114 may have may define a recess and/or an opening with a cross-section sized to receive the flexure 220. An upper portion of the base 114 may define a recess and/or an opening with a cross-section sized to receive the substrate 234. The upper portion may have an inner profile corresponding to the outer profile of the substrate 234. This may help to maximize the amount of material included in the base 114 (e.g., for providing structural rigidity to the base 114) while still providing at least a minimum spacing between the substrate 234 and the base 114.

In some non-limiting examples, the substrate 234 and the image sensor 208 may be separately attached to the flexure 220. For instance, a first set of one or more electrical traces may be routed between the substrate 234 and the flexure 220. A second, different set of one or more electrical traces may be routed between the image sensor 208 and the flexure 220. In other embodiments, the image sensor 208 may be attached to or otherwise integrated into the substrate 234, such that the image sensor 208 is connected to the flexure 220 via the substrate 234, e.g., as discussed below with reference to FIG. 4.

Figure 4:
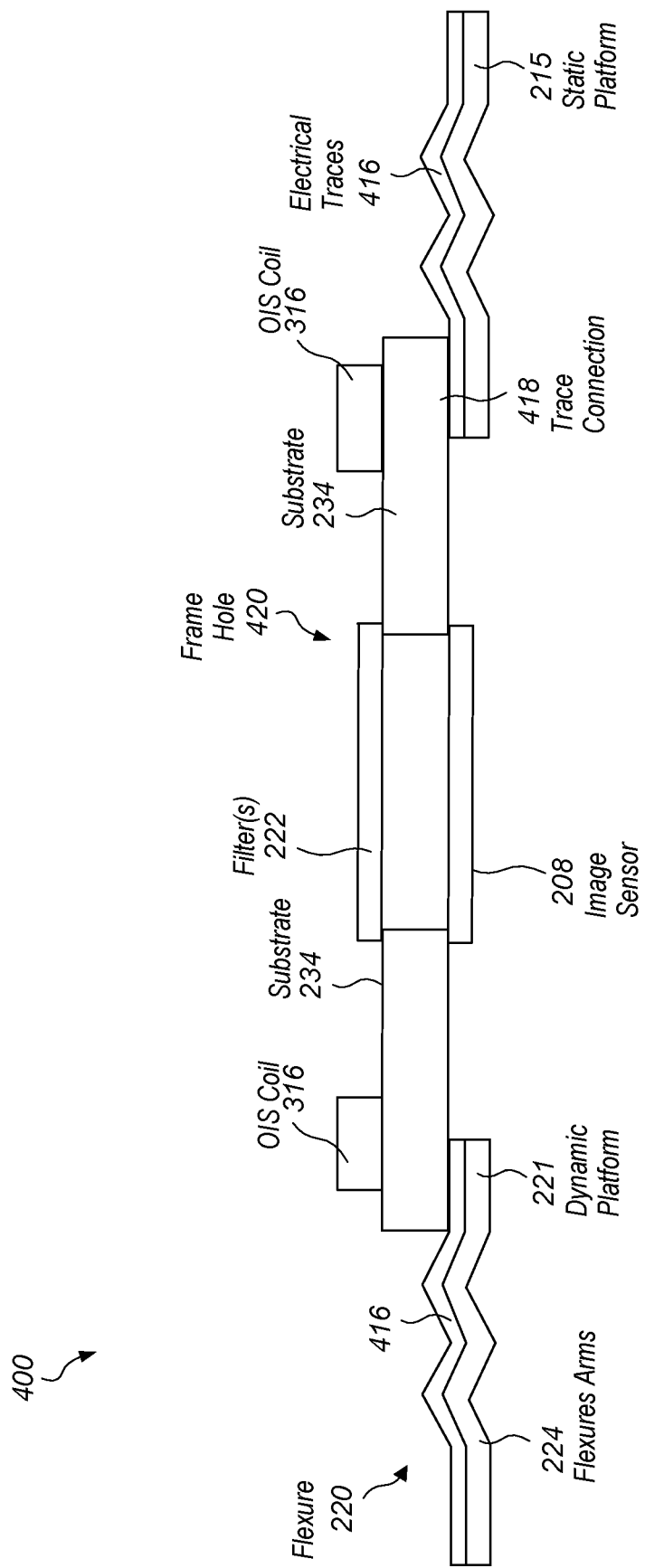
FIG. 4 illustrates a cross-sectional view of an example transverse motion voice coil motor (VCM) that may be used, for example, in a camera to provide optical image stabilization, in accordance with some embodiments.

FIG. 4 illustrates a cross-sectional view of an example transverse motion voice coil motor (VCM) 400 that may be used, for example, in a camera to provide optical image stabilization (OIS), in accordance with some embodiments. The VCM 400 may be included with and/or include one or more same or similar features as the features described with respect to or illustrated in FIGS. 1, 2A, 2B, 3, 5, 6, 7, 8, 9, 10, 11, 12, 13, 14, 15A, 15B, 16, and 17. In some embodiments, the transverse motion VCM 400 may include the flexure 220, the image sensor 208, substrate 234, and/or an OIS coil 316. The flexure 220 may include the dynamic platform 221, a static platform 215, and one or more flexure arms 224. The flexure arms 224 may connect the dynamic platform 221 to the static platform 215. In some examples, one or more of the flexure arms 224 may include one or more electrical traces 416 routed between the static platform 215 and the dynamic platform 221 and/or the substrate 234.

In some embodiments, the image sensor 208 may be attached to or otherwise integrated into the substrate 234 such that the image sensor 208 is connected to the flexure 220 via the substrate 234. In some examples, there may be one or more trace connections 418 between the substrate 234 and the flexure 220. In some cases, the flexure 220 may have a hole 420 extending therethrough, and filter(s) 222 and the image sensor 208 may be placed over openings of the hole 420. This may allow for a reduction in z height (e.g., the height of the transverse motion VCM 400 along an optical axis of the camera) in some cases.

In some examples, the substrate 234 may extend from the dynamic platform 221 such that a portion of the substrate 234 is positioned over the flexure arms 224 (e.g., in a plane above the flexure arms 224). In some examples, at least a portion of each of the OIS coils 316 to be positioned above the flexure arms 224. Such an arrangement may facilitate miniaturization of the transverse motion VCM 400 and/or the camera, as the dynamic platform 221 need not be sized to accommodate both the image sensor 208 and the OIS coils 316.

Figure 5:
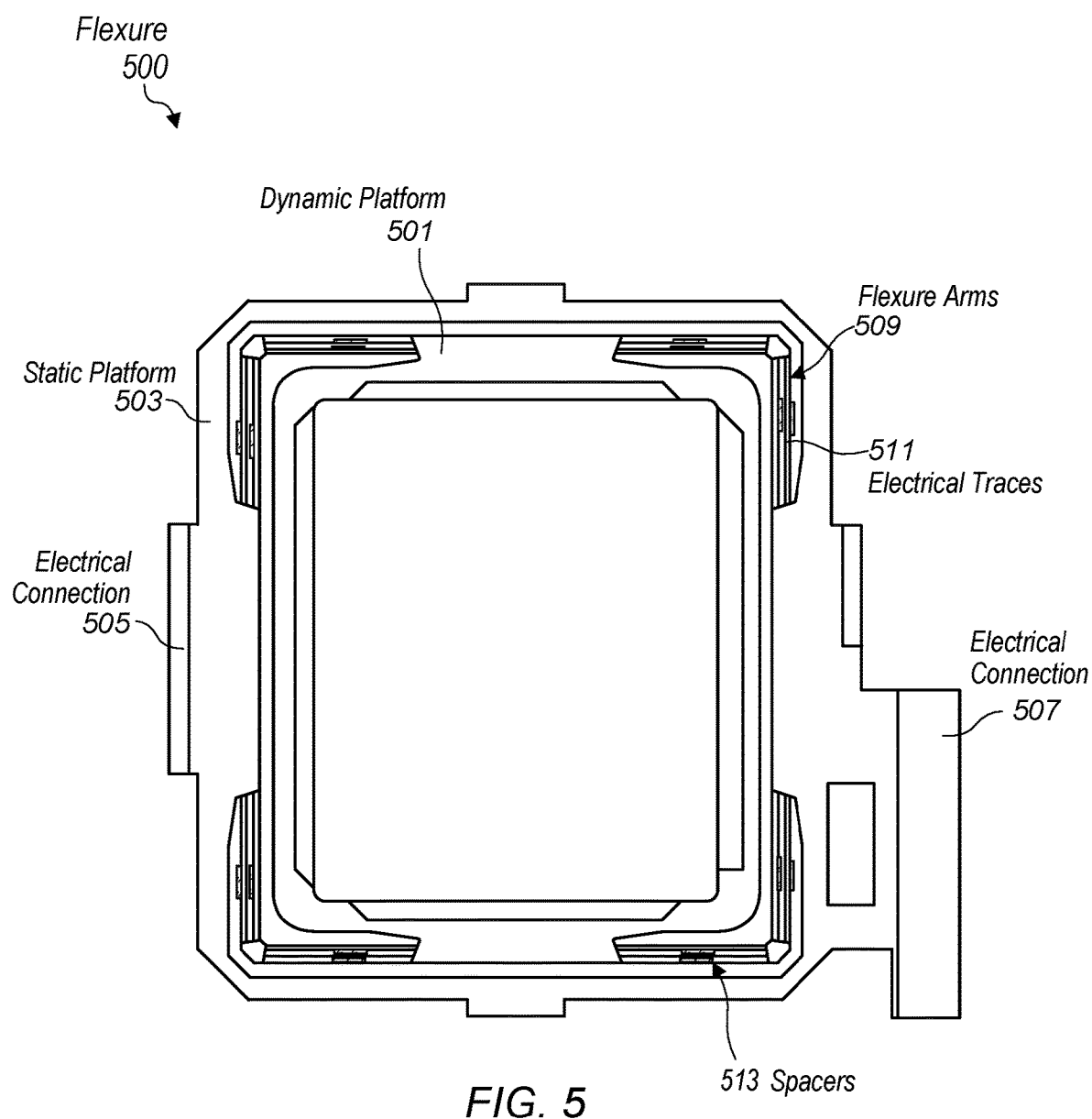
FIG. 5 illustrates an overhead view of an example flexure, in accordance with some embodiments.

FIG. 5 illustrates an overhead view of an example flexure 500, according to at least some embodiments. The flexure 500 may be combined with and/or include one or more same or similar features as the features described with respect to or illustrated in FIGS. 1, 2A, 2B, 3, 4, 6, 7, 8, 9, 10, 11, 12, 13, 14, 15A, 15B, 16, and 17. As shown in FIG. 5, the flexure 500 includes a dynamic platform 501, a static platform 503, a first set of electrical connections 505, a second set of electrical connections 507, flexure arms 509, and electrical traces 511. The dynamic platform 501 may include one or more same or similar features as the dynamic platform 221 illustrated in FIG. 4. The static platform 503 may include one or more same or similar features as the static platform 215 illustrated in FIG. 4. The flexure arms 509 may include one or more same or similar features as the flexure arms 224 illustrated in FIG. 4. The electrical traces 511 may include one or more same or similar features as the electrical traces 416 illustrated in FIG. 4. For example, the electrical traces 511 may be used to provide electronic communication between the static platform 503 and the dynamic platform 501. The first set of electrical connections 505 and/or the second set of electrical connections 507 may be used to connect the flexure 500 (e.g., and an image sensor in electronic communication with the flexure 500, and one or more electronic components in electronic communication with the flexure 500) and one or more other electronic systems of a camera.

The flexure 500 may include a plurality of spacers 513. The spacers 513 may including an elastomer (e.g., a gel, a silicon-plastic material or gel) and be selectively positioned between individual flexure arms 509 for permitting some relative displacement (e.g., while limiting and/or preventing an abnormal amount of displacement) of the flexure arms 509 as the flexure arms 509 deflect while also separating the flexure arms 509 to prevent and/or reduce contact (e.g., touching, impact force) between the flexure arms 509 during a drop event. As shown in FIG. 5, spacers 513 may be placed along each set of flexure arms 509 of the flexure 500. As described herein, the spacers 513 may have a variety of shapes (e.g., oval, spherical, droplet shaped) and sizes (short, long, thick, thin) and may be positioned between select flexure arms 509 of each set of flexure arms 509. Additionally, or alternatively, the spacers 513 may be positioned in one location or in multiple different locations along the flexure arms 509.

Figure 6:
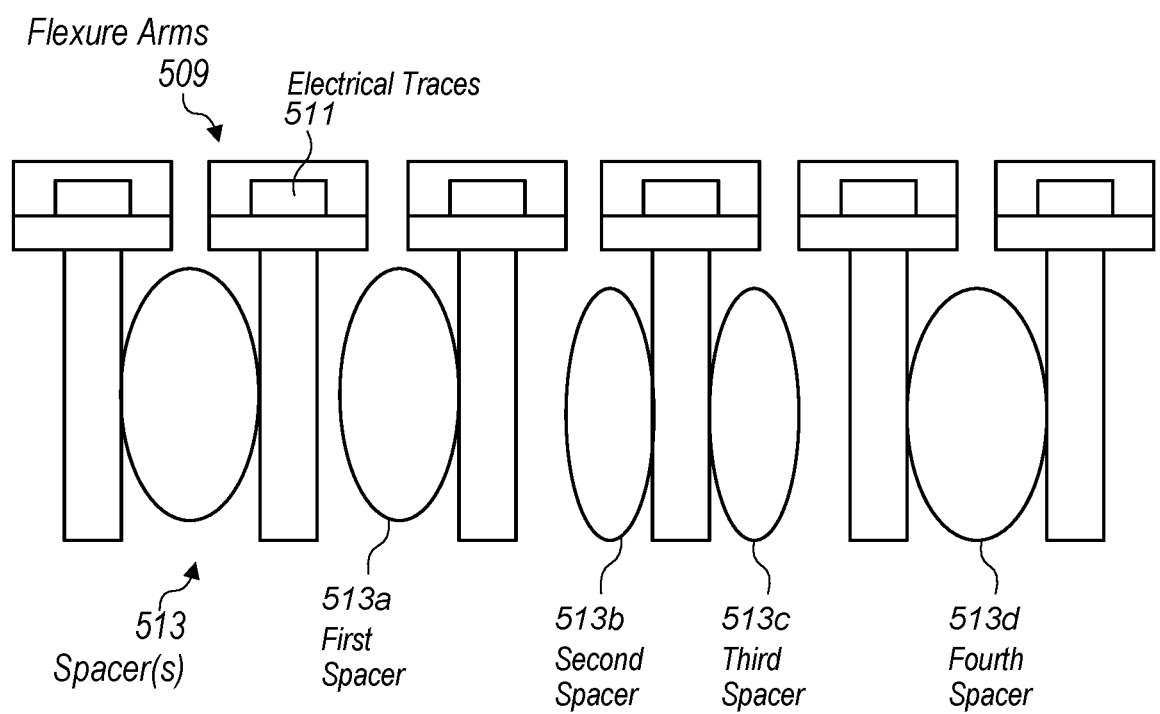
FIG. 6 illustrates a side view of example flexure arms, in accordance with some embodiments.

FIG. 6 illustrates a side view of example flexure arms 509, in accordance with some embodiments. The flexure arms 509 may be combined with and/or include one or more same or similar features as the features described with respect to or illustrated in FIGS. 1, 2A, 2B, 3, 4, 5, 7, 8, 9, 10, 11, 12, 13, 14, 15A, 15B, 16, and 17. As shown in FIG. 6, the flexure arms 509 may include electrical traces 511 used to provide electronic communication between the static platform 503 and the dynamic platform 501. The spacers 513 are positioned between the flexure arms 509, such as between at least two of the flexure arms 509. For example, as shown in FIG. 6, the spacers 513 may be positioned between each of the flexure arms 509. In some aspects, the spacers 513 may be positioned between select flexure arms (e.g., not every gap between flexure arms 509) such as between every other gap between flexure arms 509, every third gap between flexure arms 509, a first and last gap between flexure arms 509, a center gap between flexure arms 509, and/or the like. For example, the spacers 513 may be positioned between every other flexure arm 509 so that a first gap between a first pair of flexure arms 509 contains a spacer 513, a second gap adjacent the first gap does not contain a spacer 513, and a third gap adjacent the second gap and opposite the second gap from the first gap does contain a spacer 513.

In some aspects, the spacers 513 may have a variety of different shapes and sizes. For example, the spacers 513 may have a long slender shape to extend along a portion of a gap between flexure arms 509. In some cases, the spacers 513 may rest in a gap between two flexure arms 509, abutting against one flexure arm while leaving a space between the other flexure arm 709. For example, the first spacer 513a, the second spacer 513b, and the third spacer 513c may each rest between flexure arms 509 abutting against one adjacent flexure arms while leaving a space between itself and the other adjacent flexure arm 509. In some aspects, a spacers, such as fourth spacer 513d may have a width to fit snuggly (e.g., in contact with both flexure arms 509) between two flexure arms. As another example, the spacers 513 may have an oval shape or a droplet shape for positioning between flexure arms 509 at more precise points along the flexure arms 509. In some aspects, the spacers 513 may be positioned a center location along a length of two flexure arms 509. In some aspects, the spacers 513 may be positioned in multiple locations along a length of two flexure arms 509. For example, the spacers 513 at multiple locations along the length of two flexure arms 509 may form equidistant open spaces along the gap between the two flexure arms. As another example, the spacers 513 at multiple locations along the length of two flexure arms 509 may varying distance open spaces along the gap between the two flexure arms. The dimensions and configurations of the spacers 513 may be used for permitting some relative displacement (e.g., while limiting and/or preventing an abnormal amount of displacement) as flexure arms deflect while also separating the flexure arms to prevent and/or reduce contact (e.g., touching, impact force) between the flexure arms during a drop event.

Figure 7:
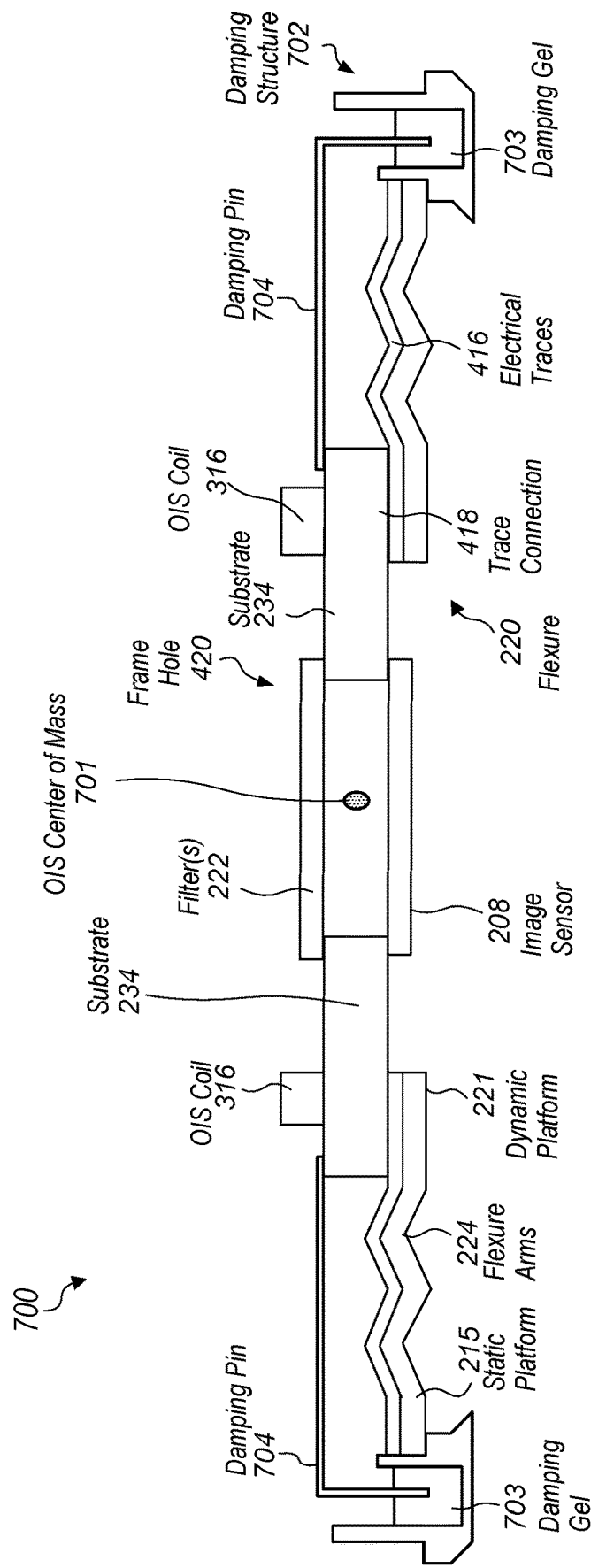
FIG. 7 illustrates a cross-sectional view of an example transverse motion voice coil motor (VCM) that may be used, for example, in a camera to provide optical image stabilization (OIS), in accordance with some embodiments.

FIG. 7 illustrates a cross-sectional view of an example transverse motion voice coil motor (VCM) 700 that may be used, for example, in a camera to provide optical image stabilization (OIS), in accordance with some embodiments. The VCM 700 may be included with and/or include one or more same or similar features as the features described with respect to or illustrated in FIGS. 1, 2A, 2B, 3, 4, 5, 6, 8, 9, 10, 11, 12, 13, 14, 15A, 15B, 16, and 17. The VCM 700 includes a damping structure 702 having reservoirs of damping gel 703 and associated damping pin 704. The interaction between the damping pins 704 and the reservoirs of damping gel 703 may provide a moment damping about the center of gravity (COG) 701. A moment produced at the plane of the VCM 700 may be counteracted by damping provided by the interaction between the damping pins 704 and the reservoirs of damping gel 703. In some aspects, the VCM 700 may include four damping structures 702 each having reservoirs of damping gel 703 and associated damping pins 704.

Figure 8:
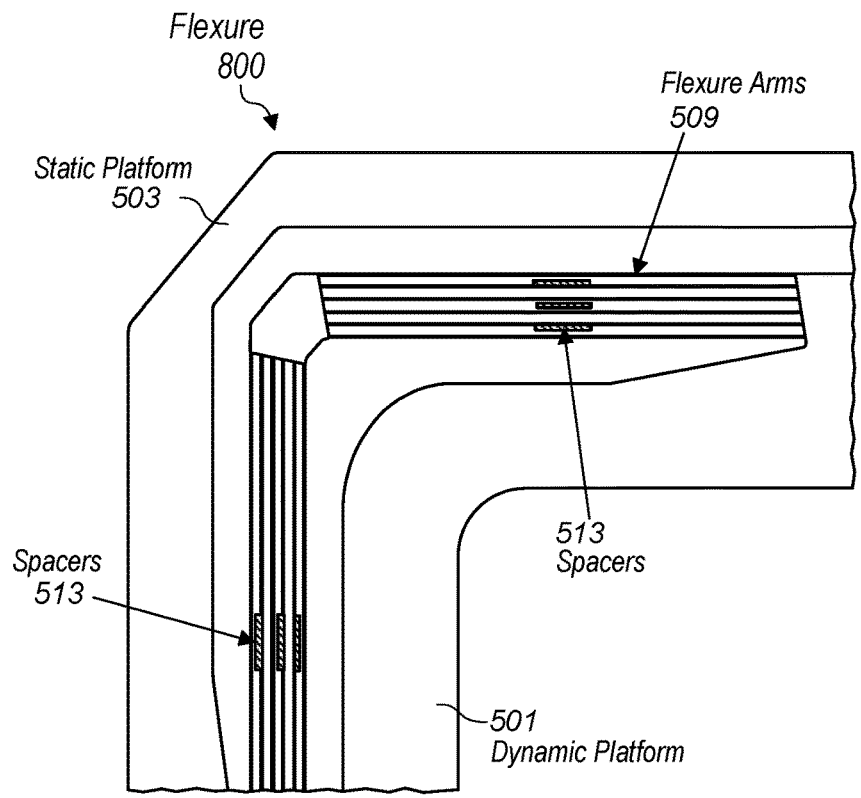
FIG. 8 illustrates an overhead view of an example flexure, in accordance with some embodiments.

FIG. 8 illustrates an overhead view of an example flexure 800, in accordance with some embodiments. The flexure 800 may be combined with and/or include one or more same or similar features as the features described with respect to or illustrated in FIGS. 1, 2A, 2B, 3, 4, 5, 6, 7, 9, 10, 11, 12, 13, 14, 15A, 15B, 16, and 17. The flexure 800 may include flexure arms 509 each having one or more spacers 513. As shown in FIG. 8, the spacers 513 may be positioned in every other gap between flexure arms 509. Also, the spacers 513 may all be positioned at a center location along a length of the flexure arms 509. The configuration of the spacers 513 of the flexure 800 may be used for permitting some relative displacement (e.g., while limiting and/or preventing an abnormal amount of displacement) as flexure arms deflect while also separating the flexure arms to prevent and/or reduce contact (e.g., touching, impact force) between the flexure arms during a drop event.

Figure 9:
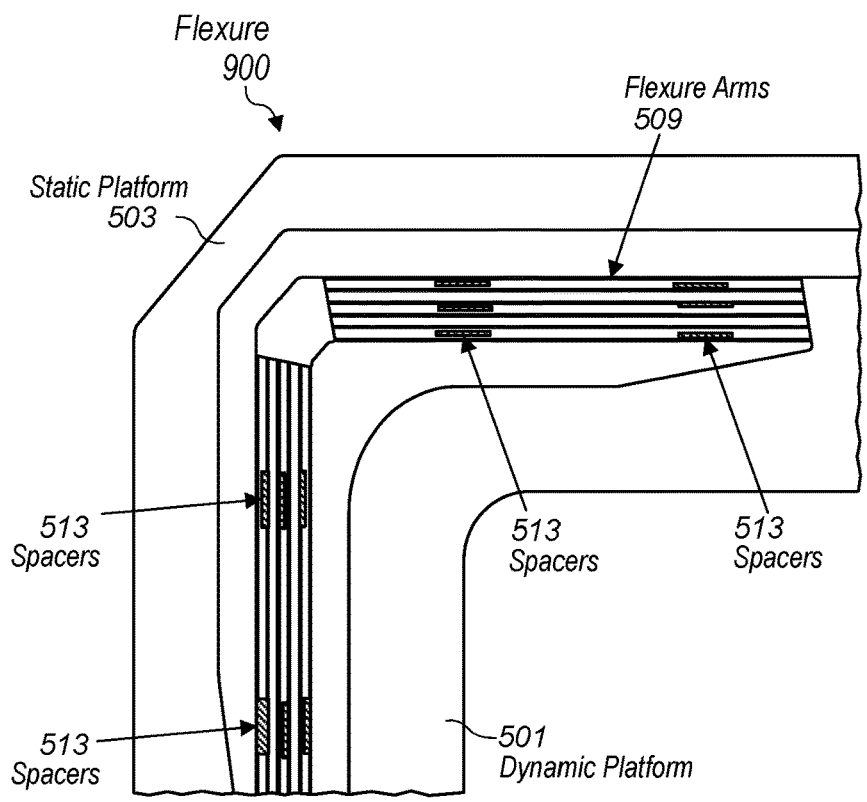
FIG. 9 illustrates an overhead view of an example flexure, in accordance with some embodiments.

FIG. 9 illustrates an overhead view of an example flexure 900, in accordance with some embodiments. The flexure 900 may be combined with and/or include one or more same or similar features as the features described with respect to or illustrated in FIGS. 1, 2A, 2B, 3, 4, 5, 6, 7, 8, 10, 11, 12, 13, 14, 15A, 15B, 16, and 17. The flexure 900 may include flexure arms 509 each having one or more spacers 513. As shown in FIG. 9, the spacers 513 may include two groups of spacers 513 per set of flexure arms 509 and may be positioned in every other gap between flexure arms 509. Also, the spacers 513 the two groups of spacers 513 may be positioned so that spaces through the gaps along a length of the flexure arms 509 all have a same or similar length. The configuration of the spacers 513 of the flexure 900 may be used for permitting some relative displacement (e.g., while limiting and/or preventing an abnormal amount of displacement) as flexure arms deflect while also separating the flexure arms to prevent and/or reduce contact (e.g., touching, impact force) between the flexure arms during a drop event.

Figure 10:
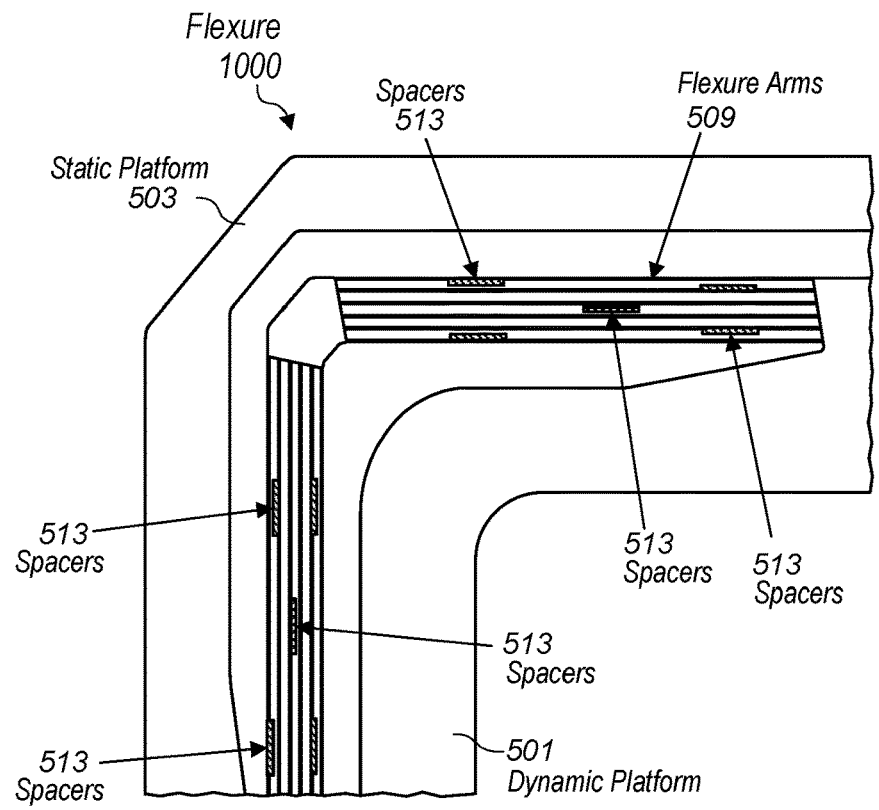
FIG. 10 illustrates an overhead view of an example flexure, in accordance with some embodiments.

FIG. 10 illustrates an overhead view of an example flexure 1000, in accordance with some embodiments. The flexure 1000 may be combined with and/or include one or more same or similar features as the features described with respect to or illustrated in FIGS. 1, 2A, 2B, 3, 4, 5, 6, 7, 8, 9, 11, 12, 13, 14, 15A, 15B, 16, and 17. The flexure 1000 may include flexure arms 509 each having one or more spacers 513. As shown in FIG. 10, the spacers 513 may include three groups of spacers 513 per set of flexure arms 509. The three groups of spacers 513 may be evenly or unevenly spaced apart along the length of the flexure arms. The three sets of spacers 513 may be positioned such that a first set of one or more spacers 513 (e.g., a set of two spacers 513) occupies a first set of one or more gaps (e.g., a set of two gaps), a second set of one or more spacers 513 (e.g., a set of one spacers 513) occupies a second set of one or more gaps (different from the first set of one or more gaps), and a third set of one or more spacers 513 (e.g., another set of two spacers 513) occupies the first set of one or more gaps. The configuration of the spacers 513 of the flexure 1000 may be used for permitting some relative displacement (e.g., while limiting and/or preventing an abnormal amount of displacement) as flexure arms deflect while also separating the flexure arms to prevent and/or reduce contact (e.g., touching, impact force) between the flexure arms during a drop event.

Figure 11:
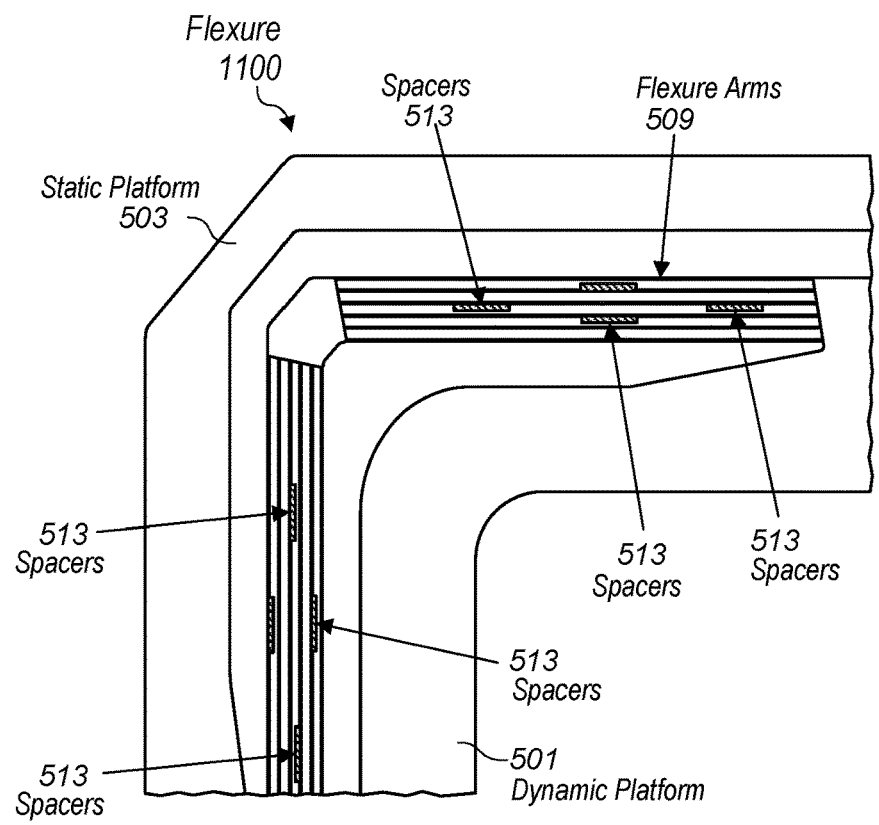
FIG. 11 illustrates an overhead view of an example flexure, in accordance with some embodiments.

FIG. 11 illustrates an overhead view of an example flexure, in accordance with some embodiments. The flexure 1100 may be combined with and/or include one or more same or similar features as the features described with respect to or illustrated in FIGS. 1, 2A, 2B, 3, 4, 5, 6, 7, 8, 9, 10, 12, 13, 14, 15A, 15B, 16, and 17. The flexure 1100 may include flexure arms 509 each having one or more spacers 513. As shown in FIG. 11, the spacers 513 may include three groups of spacers 513 per set of flexure arms 509. The three groups of spacers 513 may be evenly or unevenly spaced apart along the length of the flexure arms. The three sets of spacers 513 may be positioned such that a first set of one or more spacers 513 (e.g., a set of one spacers 513) occupies a first set of one or more gaps (e.g., a set of one gaps), a second set of one or more spacers 513 (e.g., a set of two spacers 513) occupies a second set of one or more gaps (different from the first set of one or more gaps), and a third set of one or more spacers 513 (e.g., another set of one spacers 513) occupies the first set of one or more gaps. The configuration of the spacers 513 of the flexure 1100 may be used for permitting some relative displacement (e.g., while limiting and/or preventing an abnormal amount of displacement) as flexure arms deflect while also separating the flexure arms to prevent and/or reduce contact (e.g., touching, impact force) between the flexure arms during a drop event.

Figure 12:
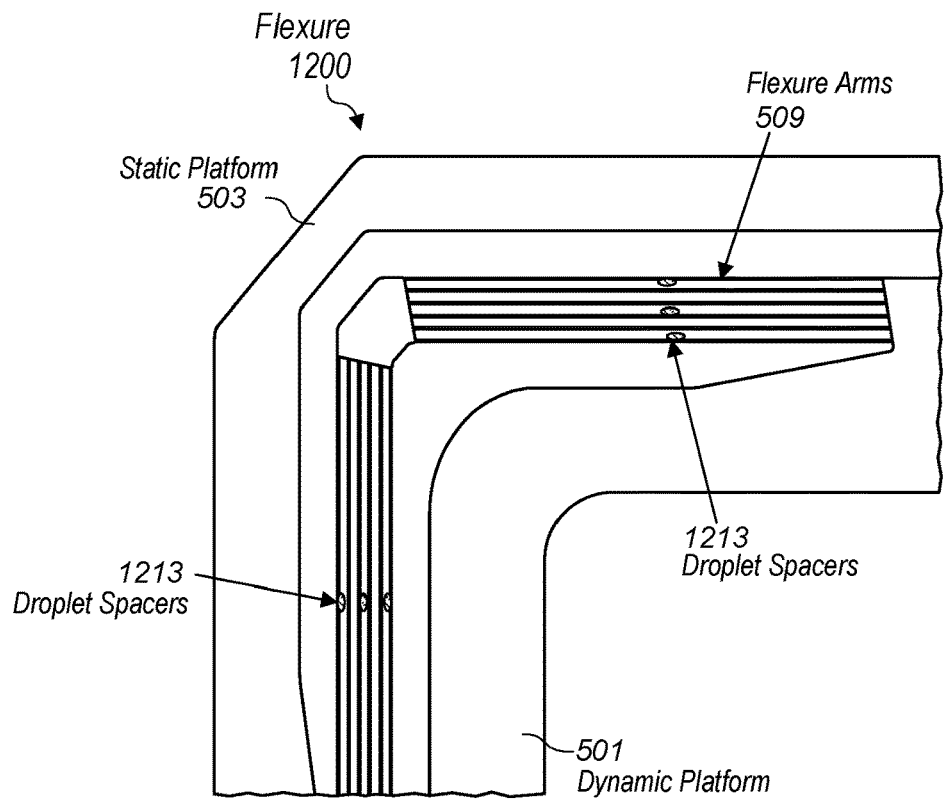
FIG. 12 illustrates an overhead view of an example flexure, in accordance with some embodiments.

FIG. 12 illustrates an overhead view of an example flexure 1200, in accordance with some embodiments. The flexure 1200 may be combined with and/or include one or more same or similar features as the features described with respect to or illustrated in FIGS. 1, 2A, 2B, 3, 4, 5, 6, 7, 8, 9, 10, 11, 13, 14, 15A, 15B, 16, and 17. The flexure 1200 may include flexure arms 509 each having one or more droplet spacers 1213. The droplet spacers 1213 may one or more same or similar features as the spacers 513. In addition, the droplet spacers 1213 may have an oval shape or a droplet-like shape for positioning between flexure arms 509 at more precise points along the flexure arms 509. As shown in FIG. 12, the droplet spacers 1213 may be positioned in every other gap between flexure arms 509. Also, the droplet spacers 1213 may all be positioned at a center location along a length of the flexure arms 509. The shape and configuration of the droplet spacers 1213 of the flexure 1200 may be used for permitting some relative displacement (e.g., while limiting and/or preventing an abnormal amount of displacement) as flexure arms deflect while also separating the flexure arms to prevent and/or reduce contact (e.g., touching, impact force) between the flexure arms during a drop event.

Figure 13:
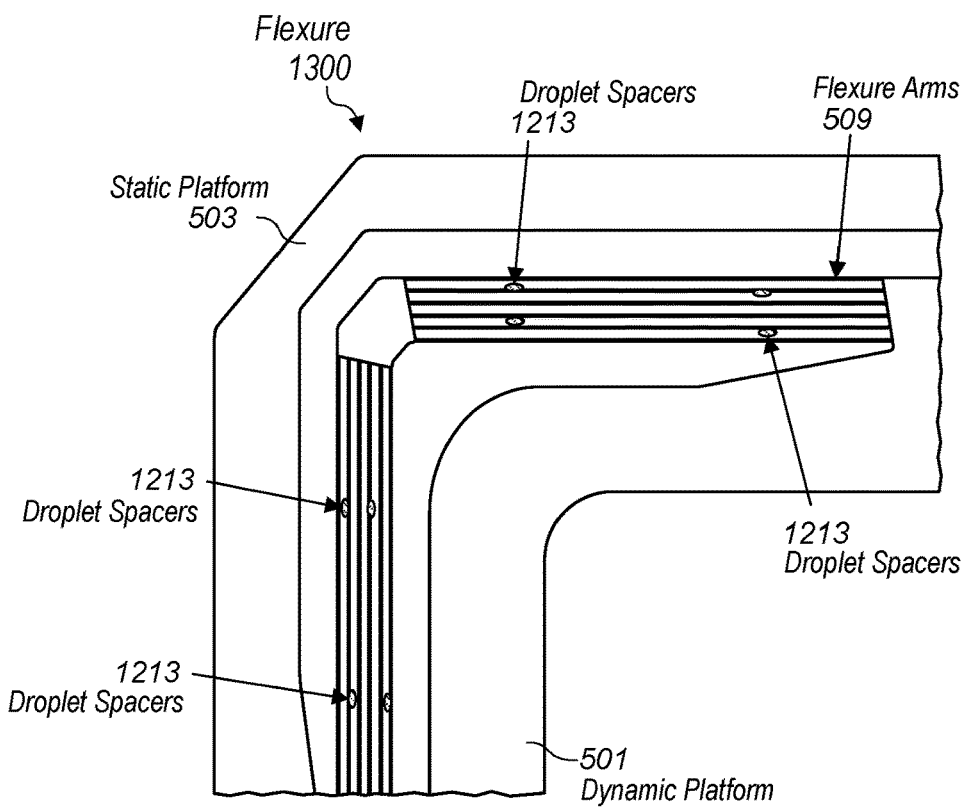
FIG. 13 illustrates an overhead view of an example flexure, in accordance with some embodiments.

FIG. 13 illustrates an overhead view of an example flexure 1300, in accordance with some embodiments. The flexure 1300 may be combined with and/or include one or more same or similar features as the features described with respect to or illustrated in FIGS. 1, 2A, 2B, 3, 4, 5, 6, 7, 8, 9, 10, 11, 12, 14, 15A, 15B, 16, and 17. The flexure 1300 may include flexure arms 509 each having one or more droplet spacers 1213. As shown in FIG. 13, the droplet spacers 1213 may include two groups of droplet spacers 1213 per set of flexure arms 509 so that a first set of droplet spacers 1213 may be positioned in a first set of two or more gaps between the flexure arms 509 and a second set of droplet spacers 1213 may be positioned in a second and different set of two or more gaps between flexure arms 509. Also, the droplet spacers 1213 of the two groups of droplet spacers 513 may be positioned so that spaces through the gaps along a length of the flexure arms 509 all have a same or similar length or each have a different length. The shape and configuration of the droplet spacers 1213 of the flexure 1300 may be used for permitting some relative displacement (e.g., while limiting and/or preventing an abnormal amount of displacement) as flexure arms deflect while also separating the flexure arms to prevent and/or reduce contact (e.g., touching, impact force) between the flexure arms during a drop event.

Figure 14:
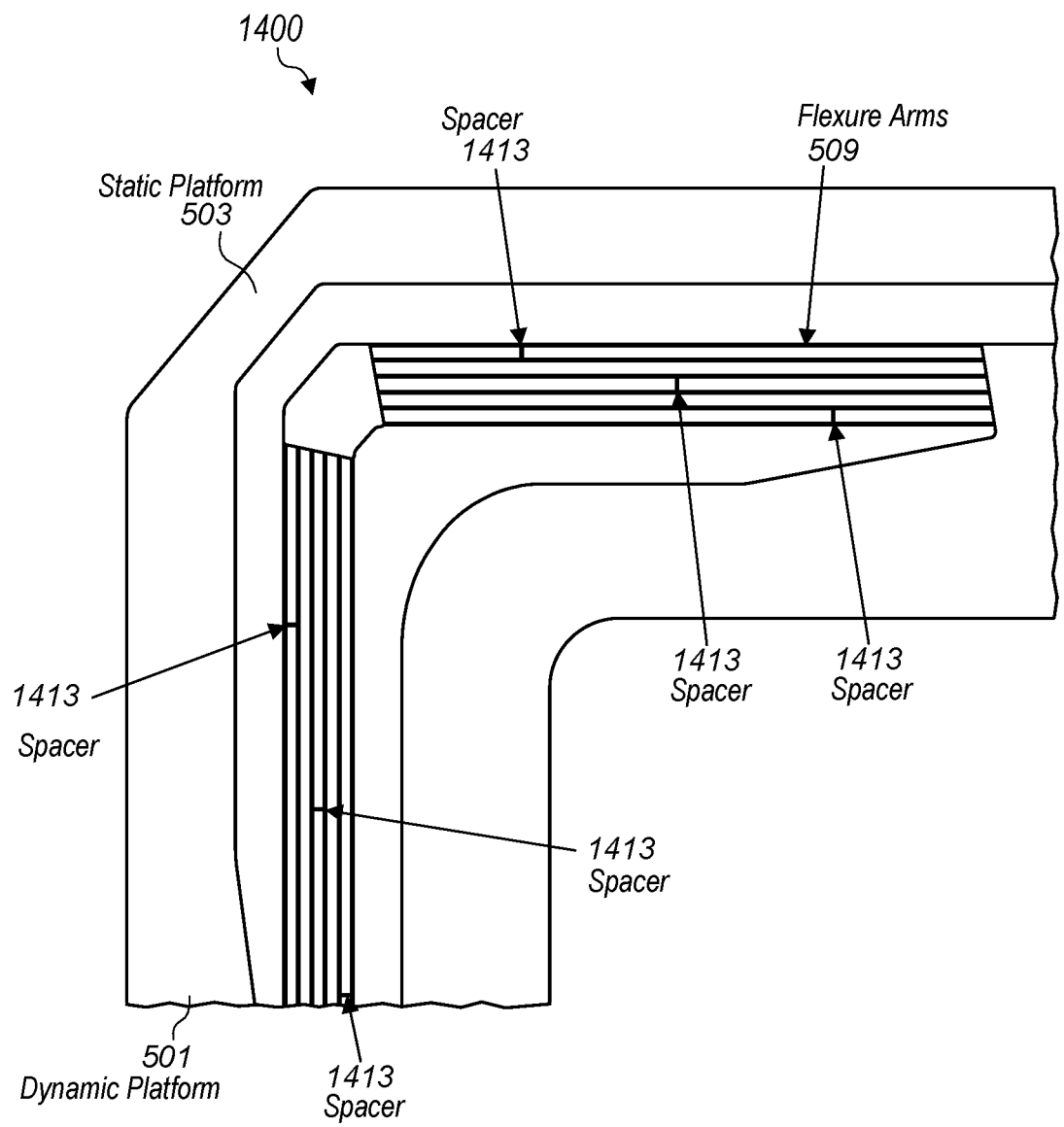
FIG. 14 illustrates an overhead view of an example flexure, in accordance with some embodiments.

FIG. 14 illustrates an overhead view of an example flexure 1400, in accordance with some embodiments. The flexure 1400 may be combined with and/or include one or more same or similar features as the features described with respect to or illustrated in FIGS. 1, 2A, 2B, 3, 4, 5, 6, 7, 8, 9, 10, 11, 12, 13, 15A, 15B, 16, and 17. The flexure 1400 may include flexure arms 509 each having one or more spacers 1413. The spacers 1413 may one or more same or similar features as the spacers 513 and/or the droplet spacers 1213. In some aspects, the spacers 1413 may include dot-like shapes having an elastic material, a hyperelastic material, or a viscoelastic material. In addition, the spacers 1413 may connect two adjacent flexure arms 509 at more precise points along the flexure arms 509. As shown in FIG. 14, the spacers 1413 may be positioned in different gaps between different pairs of flexure arms 509. Also, the spacers 1413 may all be positioned at different locations along a length of the flexure arms 509. The shape and configuration of the spacers 1413 of the flexure 1400 may be used for permitting some relative displacement (e.g., while limiting and/or preventing an abnormal amount of displacement) as flexure arms deflect while also separating the flexure arms to prevent and/or reduce contact (e.g., touching, impact force) between the flexure arms during a drop event.

Figure 15A:
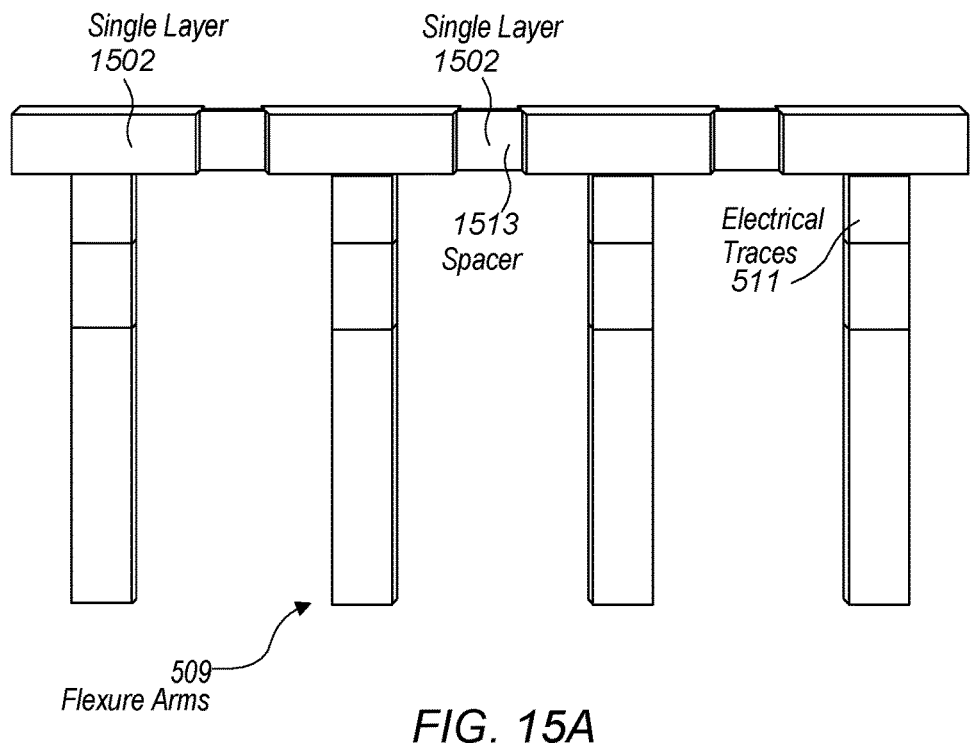
FIG. 15A illustrates a perspective side view of an example set of flexure arms, in accordance with some embodiments.
Figure 15B:
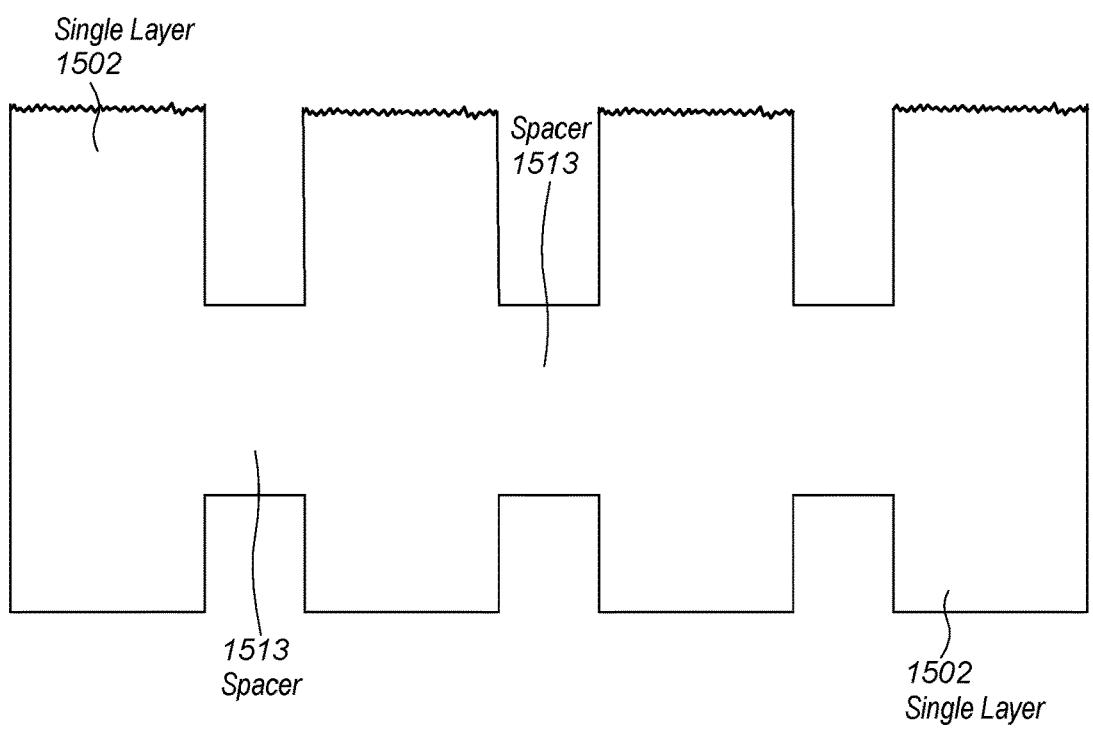
FIG. 15B illustrates a perspective overhead view of an example set of flexure arms, in accordance with some embodiments.

FIG. 15A illustrates a perspective side view of an example set of flexure arms 509, in accordance with some embodiments. FIG. 15B illustrates a perspective overhead view of an example set of flexure arms 509, in accordance with some embodiments. The flexure arms 509 may be combined with and/or include one or more same or similar features as the features described with respect to or illustrated in FIGS. 1, 2A, 2B, 3, 4, 5, 6, 7, 8, 9, 10, 11, 12, 13, 14, 16, and 17. The flexure arms 509 may include the spacers 1513. As shown in FIG. 15A, the flexure arms 509 may be include a single layer 1502 used to form spacers 1513. The spacers 1513 being formed of one material (e.g., a polyimide resin layer, PI layer) from the single layer 1502. In some aspects, the spacers 1513 illustrated in FIGS. 15A and 15B may connect each of the flexure arms 509. Alternatively, the spacers 1513 illustrated in FIGS. 15A and 15B may connect only some of the flexure arms 509 as previously described herein with respect to the spacers 513 and the droplet spacers 1213. Also, as shown in FIGS. 15A and 15B, the spacers 1513 may be positioned at a same or similar location along the length of the flexure arms 509. Alternatively, the spacers 1513 may be positioned at one or more different locations along the length of the flexure arms 509.

Figure 16:
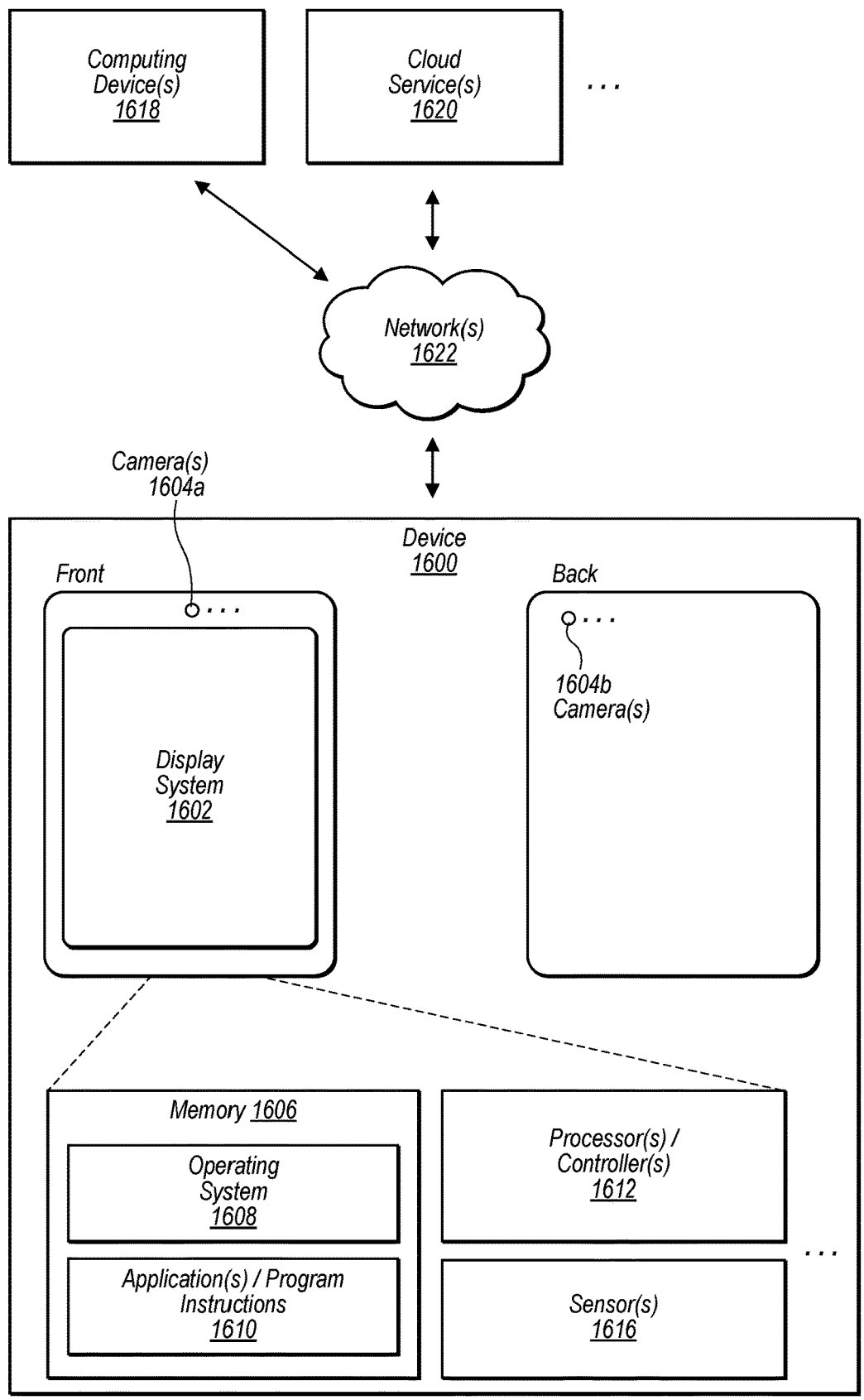
FIG. 16 illustrates a schematic representation of an example device that may include a camera, in accordance with some embodiments.

FIG. 16 illustrates a schematic representation of an example device 1600 that may include a camera (e.g., as described herein with respect to FIGS. 1, 2A, 2B, 3, 4, 5, 6, 7, 8, 9, 10, 11, 12, 13, 14, 15A, 15B, and 17), in accordance with some embodiments. In some embodiments, the device 1600 may be a mobile device and/or a multifunction device. In various embodiments, the device 1600 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In some embodiments, the device 1600 may include a display system 1602 (e.g., comprising a display and/or a touch-sensitive surface) and/or one or more cameras 1604. In some non-limiting embodiments, the display system 1602 and/or one or more front-facing cameras 1604a may be provided at a front side of the device 1600, e.g., as indicated in FIG. 16. Additionally, or alternatively, one or more rear-facing cameras 1604b may be provided at a rear side of the device 1600. In some embodiments comprising multiple cameras 1604, some or all of the cameras may be the same as, or similar to, each other. Additionally, or alternatively, some or all of the cameras may be different from each other. In various embodiments, the location(s) and/or arrangement(s) of the camera(s) 1604 may be different than those indicated in FIG. 16.

Among other things, the device 1600 may include memory 1606 (e.g., comprising an operating system 1608 and/or application(s)/program instructions 1610), one or more processors and/or controllers 1612 (e.g., comprising CPU(s), memory controller(s), display controller(s), and/or camera controller(s), etc.), and/or one or more sensors 1616 (e.g., orientation sensor(s), proximity sensor(s), and/or position sensor(s), etc.). In some embodiments, the device 1600 may communicate with one or more other devices and/or services, such as computing device(s) 1618, cloud service(s) 1620, etc., via one or more networks 1622. For example, the device 1600 may include a network interface (e.g., network interface 1610) that enables the device 1600 to transmit data to, and receive data from, the network(s) 1622. Additionally, or alternatively, the device 1600 may be capable of communicating with other devices via wireless communication using any of a variety of communications standards, protocols, and/or technologies.

Figure 17:
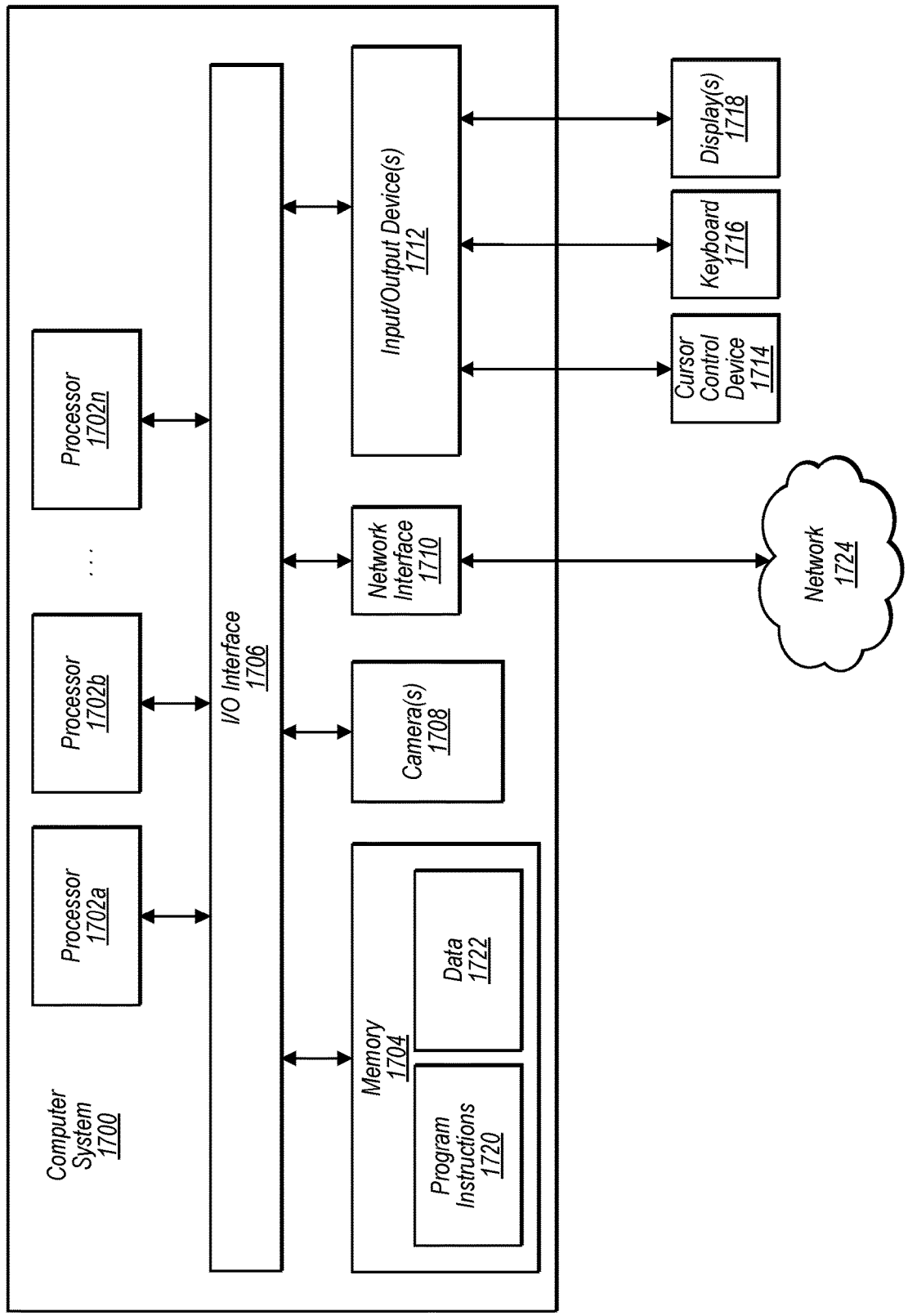
FIG. 17 illustrates a schematic block diagram of an example computing device, referred to as computer system, that may include or host embodiments of a camera, in accordance with some embodiments.

FIG. 17 illustrates a schematic block diagram of an example computing device, referred to as computer system

1700, that may include or host embodiments of a camera (e.g., as described herein with respect to FIGS. 1, 2A, 2B, 3, 4, 5, 6, 7, 8, 9, 10, 11, 12, 13, 14, 15, and 16). In addition, computer system 1700 may implement methods for controlling operations of the camera and/or for performing image processing images captured with the camera. In some embodiments, the device 1700 (described herein with reference to FIG. 17) may additionally, or alternatively, include some or all of the functional components of the computer system 1700 described herein.

The computer system 1700 may be configured to execute any or all of the embodiments described above. In different embodiments, computer system 1700 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In the illustrated embodiment, computer system 1700 includes one or more processors 1702 coupled to a system memory 1704 via an input/output (I/O) interface 1706. Computer system 1700 further includes one or more cameras 1708 coupled to the I/O interface 1706. Computer system 1700 further includes a network interface 1710 coupled to I/O interface 1706, and one or more input/output devices 1712, such as cursor control device 1714, keyboard 1716, and display(s) 1718. In some cases, it is contemplated that embodiments may be implemented using a single instance of computer system 1700, while in other embodiments multiple such systems, or multiple nodes making up computer system 1700, may be configured to host different portions or instances of embodiments. For example, in one embodiment some elements may be implemented via one or more nodes of computer system 1700 that are distinct from those nodes implementing other elements.

In various embodiments, computer system 1700 may be a uniprocessor system including one processor 1702, or a multiprocessor system including several processors 1702 (e.g., two, four, eight, or another suitable number). Processors 1702 may be any suitable processor capable of executing instructions. For example, in various embodiments processors 1702 may be general-purpose or embedded processors implementing any of a variety of instruction set architectures (ISAs), such as the x86, PowerPC, SPARC, or MIPS ISAs, or any other suitable ISA. In multiprocessor systems, each of processors 1702 may commonly, but not necessarily, implement the same ISA.

System memory 1704 may be configured to store program instructions 1720 accessible by processor 1702. In various embodiments, system memory 1704 may be implemented using any suitable memory technology, such as static random access memory (SRAM), synchronous dynamic RAM (SDRAM), nonvolatile/Flash-type memory, or any other type of memory. Additionally, existing camera control data 1722 of memory 1704 may include any of the information or data structures described above. In some embodiments, program instructions 1720 and/or data 1722 may be received, sent or stored upon different types of computer-accessible media or on similar media separate from system memory 1704 or computer system 1700. In various embodiments, some or all of the functionality described herein may be implemented via such a computer system 1700.

In one embodiment, I/O interface 1706 may be configured to coordinate I/O traffic between processor 1702, system memory 1704, and any peripheral devices in the device, including network interface 1710 or other peripheral interfaces, such as input/output devices 1712. In some embodiments, I/O interface 1706 may perform any necessary protocol, timing or other data transformations to convert data signals from one component (e.g., system memory 1704) into a format suitable for use by another component (e.g., processor 1702). In some embodiments, I/O interface 1706 may include support for devices attached through various types of peripheral buses, such as a variant of the Peripheral Component Interconnect (PCI) bus standard or the Universal Serial Bus (USB) standard, for example. In some embodiments, the function of I/O interface 1706 may be split into two or more separate components, such as a north bridge and a south bridge, for example. Also, in some embodiments some or all of the functionality of I/O interface 1706, such as an interface to system memory 1704, may be incorporated directly into processor 1702.

Network interface 1710 may be configured to allow data to be exchanged between computer system 1700 and other devices attached to a network 1724 (e.g., carrier or agent devices) or between nodes of computer system 1700. Network 1724 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1710 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1712 may, in some embodiments, include one or more display terminals, keyboards, keypads, touchpads, scanning devices, voice or optical recognition devices, or any other devices suitable for entering or accessing data by one or more computer systems 1700. Multiple input/output devices 1712 may be present in computer system 1700 or may be distributed on various nodes of computer system 1700. In some embodiments, similar input/output devices may be separate from computer system 1700 and may interact with one or more nodes of computer system 1700 through a wired or wireless connection, such as over network interface 1710.

Those skilled in the art will appreciate that computer system 1700 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1700 may be transmitted to computer system 1700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A camera, comprising:
   a lens group;
   an image sensor;
   an actuator to move the image sensor relative to the lens group; and
   a flexure that suspends the image sensor from a stationary structure of the camera and that allows motion of the image sensor enabled by the actuator, the flexure comprising:
   a dynamic platform to which the image sensor is connected such that the image sensor moves with the dynamic platform,
   a static platform connected to a static portion of the camera,
   a plurality of flexure arms that mechanically connect the dynamic platform to the static platform, and
   one or more elastic spacers positioned between at least two flexure arms of the plurality of flexure arms, wherein the one or more elastic spacers comprises at least one of a hyper-elastic material or a viscoelastic material.

2. The camera of claim 1, wherein the one or more elastic spacers are positioned between each of the flexure arms of the plurality of flexure arms.

3. The camera of claim 1, wherein the one or more elastic spacers are positioned between at least two flexure arms of the plurality of flexure arms at a location equidistant from a turn of the plurality of flexure arms and a termination location of the plurality of flexure arms.

4. The camera of claim 1, wherein the one or more elastic spacers are positioned between at least two flexure arms of the plurality of flexure arms at one or more different locations between a turn of the plurality of flexure arms and a termination location of the plurality of flexure arms.

5. The camera of claim 1, wherein the one or more elastic spacers comprise a gel.

6. The camera of claim 1, wherein the one or more elastic spacers permit a relative displacement of the plurality of flexure arms as the plurality of flexure arms deflect during a drop event of the camera.

7. The camera of claim 1, wherein the one or more elastic spaces are positioned between every other flexure arm of the plurality of flexure arms.

8. A device, comprising:
   one or more processors;
   memory storing program instructions executable by the one or more processors to control operation of a camera; and
   the camera comprising:
   a lens group;
   an image sensor;
   an actuator to move the image sensor relative to the lens group; and
   a flexure that suspends the image sensor from a stationary structure of the camera and that allows motion of the image sensor enabled by the actuator, the flexure comprising:
   a dynamic platform to which the image sensor is connected such that the image sensor moves with the dynamic platform,
   a static platform connected to a static portion of the camera,
   a plurality of flexure arms that mechanically connect the dynamic platform to the static platform, and
   one or more elastic spacers positioned between at least two flexure arms of the plurality of flexure arms, wherein the one or more elastic spacers comprises at least one of a hyper-elastic material or a viscoelastic material.

9. The device of claim 8, wherein the one or more elastic spacers are positioned between each of the flexure arms of the plurality of flexure arms.

10. The device of claim 8, wherein the one or more elastic spacers are positioned between at least two flexure arms of the plurality of flexure arms at a location equidistant from a turn of the plurality of flexure arms and a termination location of the plurality of flexure arms.

11. The device of claim 8, wherein the one or more elastic spacers are positioned between at least two flexure arms of the plurality of flexure arms at one or more different locations between a turn of the plurality of flexure arms and a termination location of the plurality of flexure arms.

12. The device of claim 8, wherein the one or more elastic spacers comprise a gel.

13. The device of claim 8, wherein the one or more elastic spacers permit a relative displacement of the plurality of flexure arms as the plurality of flexure arms deflect during a drop event of the camera.

14. The device of claim 8, wherein the one or more elastic spaces are positioned between every other flexure arm of the plurality of flexure arms.

15. A flexure for a camera module, comprising:
   a dynamic platform to which an image sensor is connected such that the image sensor moves with the dynamic platform;
   a static platform for connection to a static portion of the camera module;
   a plurality of flexure arms that mechanically connect the dynamic platform to the static platform; and
   one or more elastic spacers positioned between at least two flexure arms of the plurality of flexure arms, wherein the one or more elastic spacers comprises at least one of a hyper-elastic material or a viscoelastic material.

16. The flexure of claim 15, wherein the one or more elastic spacers are positioned between each of the flexure arms of the plurality of flexure arms.

17. The flexure of claim 15, wherein the one or more elastic spacers are positioned between at least two flexure arms of the plurality of flexure arms at a location equidistant from a turn of the plurality of flexure arms and a termination location of the plurality of flexure arms.

18. The flexure of claim 15, wherein the one or more elastic spacers are positioned between at least two flexure arms of the plurality of flexure arms at one or more different locations between a turn of the plurality of flexure arms and a termination location of the plurality of flexure arms.

19. The flexure of claim 15, wherein the one or more elastic spacers comprise a gel.

20. The flexure of claim 15, wherein the one or more elastic spacers permit a relative displacement of the plurality of flexure arms as the plurality of flexure arms deflect during a drop event of the camera.

* * * * *